(12) United States Patent
Nekhamkin et al.

(10) Patent No.: US 8,040,989 B2
(45) Date of Patent: Oct. 18, 2011

(54) SYSTEM AND METHOD FOR SAMPLING RATE ADJUSTMENT OF DIGITAL RADIO RECEIVER

(75) Inventors: Michael Nekhamkin, Bridgewater, NJ (US); Valeriy Lotarevich, Brooklyn, NY (US); William Schier, Levittown, PA (US)

(73) Assignee: iBiquity Digital Corporation, Columbia, MD (US)

( * ) Notice: Subject to any disclaimer, the term of this patent is extended or adjusted under 35 U.S.C. 154(b) by 787 days.

(21) Appl. No.: 12/010,731

(22) Filed: Jan. 29, 2008

(65) Prior Publication Data

US 2009/0190701 A1  Jul. 30, 2009

(51) Int. Cl.
*H04L 7/00* (2006.01)
(52) U.S. Cl. ........................................ 375/355; 375/354
(58) Field of Classification Search .................... 375/355
See application file for complete search history.

(56) References Cited

U.S. PATENT DOCUMENTS

| | | | | |
|---|---|---|---|---|
| 5,809,009 A * | 9/1998 | Matsuoka et al. | ............ | 370/206 |
| 6,134,286 A * | 10/2000 | Chennakeshu et al. | ....... | 375/365 |
| 6,167,466 A | 12/2000 | Nguyen et al. | | |
| 6,246,735 B1 | 6/2001 | Sano et al. | | |
| 6,333,767 B1 * | 12/2001 | Patel et al. | .................... | 348/725 |
| 6,334,219 B1 * | 12/2001 | Hill et al. | ........................ | 725/106 |
| 6,418,558 B1 * | 7/2002 | Roberts et al. | ................ | 725/129 |
| 6,539,065 B1 | 3/2003 | Furukawa | | |
| 6,603,822 B2 * | 8/2003 | Brede et al. | .................... | 375/340 |
| 6,662,000 B1 * | 12/2003 | Belveze et al. | ............... | 455/208 |
| 6,671,340 B1 | 12/2003 | Kroeger et al. | | |
| 6,674,817 B1 * | 1/2004 | Dolle et al. | ................... | 375/342 |

(Continued)

OTHER PUBLICATIONS

National Radio Standards Committee NRSC-5-A In-band/on-channel Digital Radio Broadcasting Standard, Sep. 2005 *available at* http://www.nrscstandards.org/SG/NRSC-5-A.asp.    International Search report dated May 26, 2009 from corresponding International Application No. PCT/US2009/00528.
Written Opinion of the International Searching Authority dated May 26, 2009 from corresponding International Application No. PCT/US2009/000528.

*Primary Examiner* — Dac Ha
*Assistant Examiner* — Erin File
(74) *Attorney, Agent, or Firm* — Jones Day

(57) ABSTRACT

Methods and systems for adjusting a sampling rate of a digital radio receiver are disclosed that comprise the steps of receiving from a decoder a first frame of data having a first number of samples; determining at the digital radio receiver a phase difference between a receiver clock and a transmitter clock; generating at the digital radio receiver a second frame of data having a second number of samples, wherein the second number of samples depends on the phase difference between the receiver clock and the transmitter clock such that the second number of samples is less than the first number of samples if the transmitter clock is ahead of the receiver clock, and the second number of samples is greater than the first number of samples if the receiver clock is ahead of the transmitter clock; outputting the second frame of data having the second number of samples; and requesting a next frame of data from the decoder at a time that is earlier than a processing time for the first number of samples if the transmitter clock is ahead of the receiver clock and at a time that is later than the processing time for the first number of samples if the receiver clock is ahead of the transmitter clock such that the next frame of data from the decoder and a next transmitter frame are synchronized, and wherein whether the second number of samples is greater than or less than the first number of samples is determined by whether the sampling rate is increased or decreased.

33 Claims, 6 Drawing Sheets

U.S. PATENT DOCUMENTS

| | | |
|---|---|---|
| 6,693,983 B1 * | 2/2004 | Moher et al. .................. 375/341 |
| RE38,456 E * | 3/2004 | Patel et al. ..................... 348/726 |
| 6,721,337 B1 | 4/2004 | Kroeger et al. |
| 7,675,843 B2 * | 3/2010 | Geile ............................ 370/206 |
| 2002/0037030 A1 * | 3/2002 | Goto ............................. 375/152 |
| 2005/0207519 A1 * | 9/2005 | Phang et al. ................. 375/354 |
| 2005/0281360 A1 * | 12/2005 | Booth et al. .................. 375/346 |
| 2006/0209941 A1 * | 9/2006 | Kroeger ........................ 375/222 |
| 2007/0038083 A1 * | 2/2007 | Srinivasan et al. ............ 600/437 |
| 2007/0110185 A1 | 5/2007 | Kroeger et al. |
| 2007/0126936 A1 | 6/2007 | Fujihira et al. |
| 2009/0190701 A1 * | 7/2009 | Nekhamkin et al. .......... 375/355 |

* cited by examiner

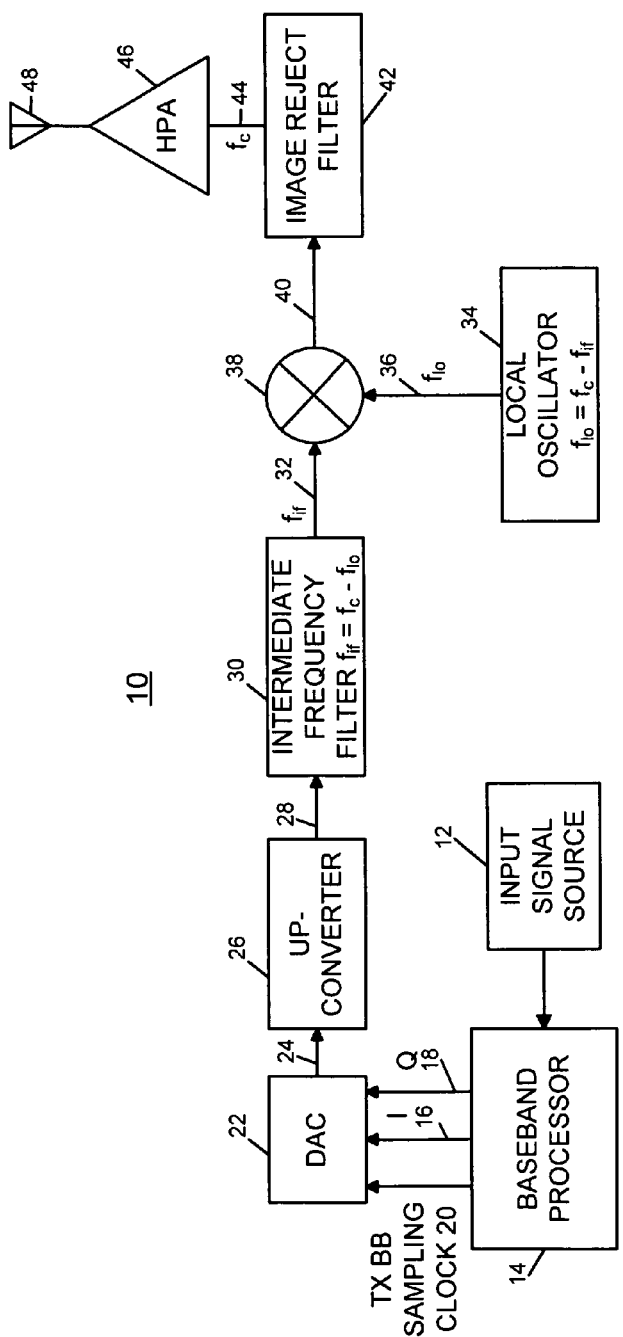
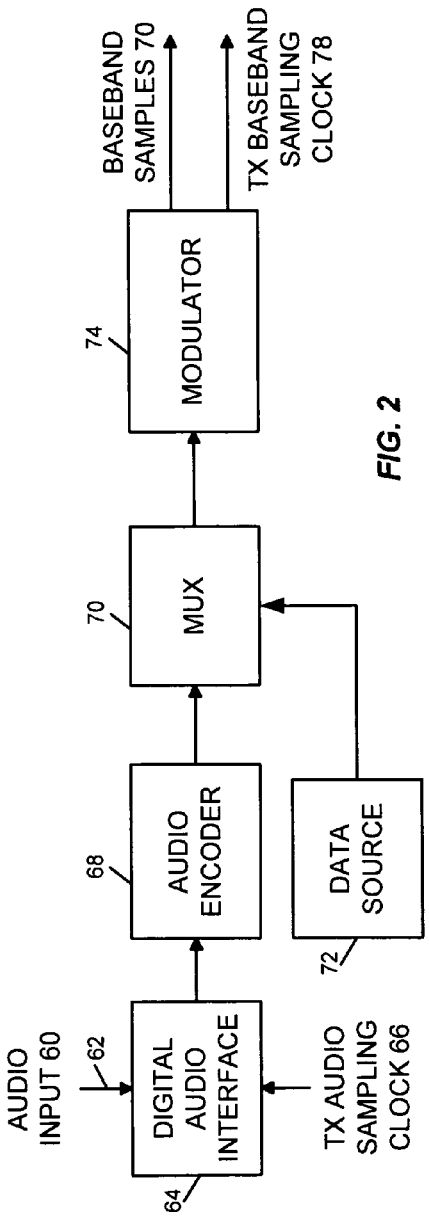
FIG. 1
FIG. 2

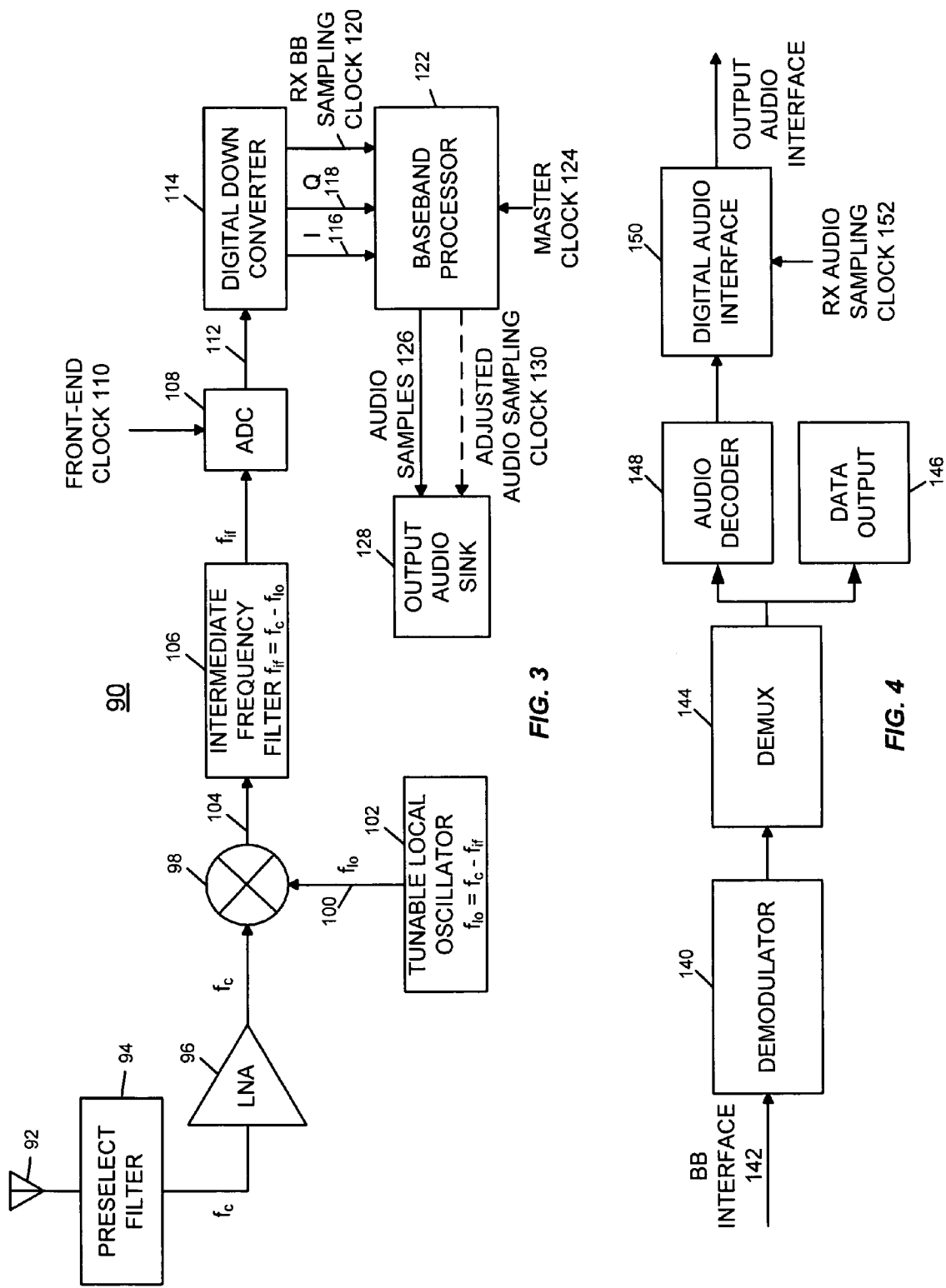

SYSTEM AND METHOD FOR SAMPLING RATE ADJUSTMENT OF DIGITAL RADIO RECEIVER

BACKGROUND

1. Field of the Disclosure

The present disclosure relates to digital radio broadcast receivers and, in particular, to methods and systems for sampling rate adjustment in digital radio receivers.

2. Background Information

Digital radio broadcasting technology delivers digital audio and data services to mobile, portable, and fixed receivers. One type of digital radio broadcasting, referred to as in-band on-channel (IBOC) digital audio broadcasting (DAB), uses terrestrial transmitters in the existing Medium Frequency (MF) and Very High Frequency (VHF) radio bands. HD Radio™ technology, developed by iBiquity Digital Corporation, is one example of an IBOC implementation for digital radio broadcasting and reception.

IBOC DAB signals can be transmitted in a hybrid format including an analog modulated carrier in combination with a plurality of digitally modulated carriers or in an all -digital format wherein the analog modulated carrier is not used. Using the hybrid mode, broadcasters may continue to transmit analog AM and FM simultaneously with higher-quality and more robust digital signals, allowing themselves and their listeners to convert from analog-to-digital radio while maintaining their current frequency allocations.

One feature of digital transmission systems is the inherent ability to simultaneously transmit both digitized audio and data. Thus the technology also allows for wireless data services from AM and FM radio stations. The broadcast signals can include metadata, such as the artist, song title, or station call letters. Special messages about events, traffic, and weather can also be included. For example, traffic information, weather forecasts, news, and sports scores can all be scrolled across a radio receiver's display while the user listens to a radio station.

IBOC DAB technology can provide digital quality audio, superior to existing analog broadcasting formats. Because each IBOC DAB signal is transmitted within the spectral mask of an existing AM or FM channel allocation, it requires no new spectral allocations. IBOC DAB promotes economy of spectrum while enabling broadcasters to supply digital quality audio to the present base of listeners.

Multicasting, the ability to deliver several audio programs or streams over one channel in the AM or FM spectrum, enables stations to broadcast multiple streams on separate supplemental or sub-channels of the main frequency. For example, multiple streams of data can include alternative music formats, local traffic, weather, news, and sports. The supplemental channels can be accessed in the same manner as the traditional station frequency using tuning or seeking functions. For example, if the analog modulated signal is centered at 94.1 MHz, the same broadcast in IBOC DAB can include supplemental channels 94.1-1, 94.1-2, and 94.1-3. Highly specialized programming on supplemental channels can be delivered to tightly targeted audiences, creating more opportunities for advertisers to integrate their brand with program content. As used herein, multicasting includes the transmission of one or more programs in a single digital radio broadcasting channel or on a single digital radio broadcasting signal. Multicast content over IBOC DAB transmissions can include a main program service (MPS), supplemental program services (SPS), program service data (PSD), and/or other broadcast data.

The National Radio Systems Committee, a standard-setting organization sponsored by the National Association of Broadcasters and the Consumer Electronics Association, adopted an IBOC standard, designated NRSC-5A, in September 2005. NRSC-5A, the disclosure of which is incorporated herein by reference, sets forth the requirements for broadcasting digital audio and ancillary data over AM and FM broadcast channels. The standard and its reference documents contain detailed explanations of the RF/transmission subsystem and the transport and service multiplex subsystems. Copies of the standard can be obtained from the NRSC at http://www.nrscstandards.org/standards.asp. iBiquity's HD Radio technology is an implementation of the NRSC-5A IBOC standard. Further information regarding HD Radio technology can be found at www.hdradio.com and www.ibiquity.com.

Other types of digital radio broadcasting systems include satellite systems such as Satellite Digital Audio Radio Service (SDARS , e.g., XM Radio™, Sirius®), Digital Audio Radio Service (DARS, e.g., WorldSpace®), and terrestrial systems such as Digital Radio Mondiale (DRM), Eureka 147 (branded as DAB Digital Audio Broadcasting®), DAB Version 2, and FMeXtra®. As used herein, the phrase "digital radio broadcasting" encompasses digital audio and data broadcasting including in-band on-channel broadcasting, as well as other digital terrestrial broadcasting and satellite broadcasting.

Digital radio broadcasting systems use a variety of audio encoding/decoding techniques. These techniques typically require synchronization between clocks in the digital radio transmitter and receiver to match the audio sampling rates. The present inventors have observed that in certain systems, such as where the receiver's baseband processor is not the master of the receiver clock, there is a need to adjust the receiver's audio sampling rate without synchronizing the receiver audio sampling clock with the transmitter audio sampling clock.

SUMMARY

Embodiments of the present disclosure are directed to systems and methods that may satisfy this need. According to exemplary embodiments, a method of adjusting the sampling rate of a digital radio receiver is disclosed. The method comprises the steps of receiving from a decoder a first frame of data having a first number of samples; determining at the digital radio receiver a phase difference between a receiver clock and a transmitter clock; generating at the digital radio receiver a second frame of data having a second number of samples, wherein the second number of samples depends on the phase difference between the receiver clock and the transmitter clock such that the second number of samples is less than the first number of samples if the transmitter clock is ahead of the receiver clock, and the second number of samples is greater than the first number of samples if the receiver clock is ahead of the transmitter clock; outputting the second frame of data having the second number of samples; and requesting a next frame of data from the decoder at a time that is earlier than a processing time for the first number of samples if the transmitter clock is ahead of the receiver clock and at a time that is later than the processing time for the first number of samples if the receiver clock is ahead of the transmitter clock, such that the next frame of data from the decoder and a next transmitter frame are synchronized, wherein whether the second number of samples is greater than or less than the first number of samples is determined by whether the sampling rate is increased or decreased.

A system comprising a processing system and a memory coupled to the processing system are described wherein the processing system is configured to carry out the above-described method. Computer programming instructions adapted to cause a processing system to carry out the above-described method may be embodied within any suitable computer readable medium.

BRIEF DESCRIPTION OF THE DRAWINGS

These and other features, aspects, and advantages of the present disclosure will become better understood with regard to the following description, appended claims, and accompanying drawings wherein:

FIG. 1 illustrates a block diagram of an exemplary IBOC DAB transmitter in accordance with certain embodiments;

FIG. 2 illustrates a block diagram of an exemplary transmitter baseband processor in accordance with certain embodiments;

FIG. 3 illustrates a block diagram of an exemplary IBOC DAB receiver in accordance with certain embodiments;

FIG. 4 illustrates a block diagram of a conventional exemplary receiver baseband processor;

DETAILED DESCRIPTION OF EXEMPLARY EMBODIMENTS

Figure 5:
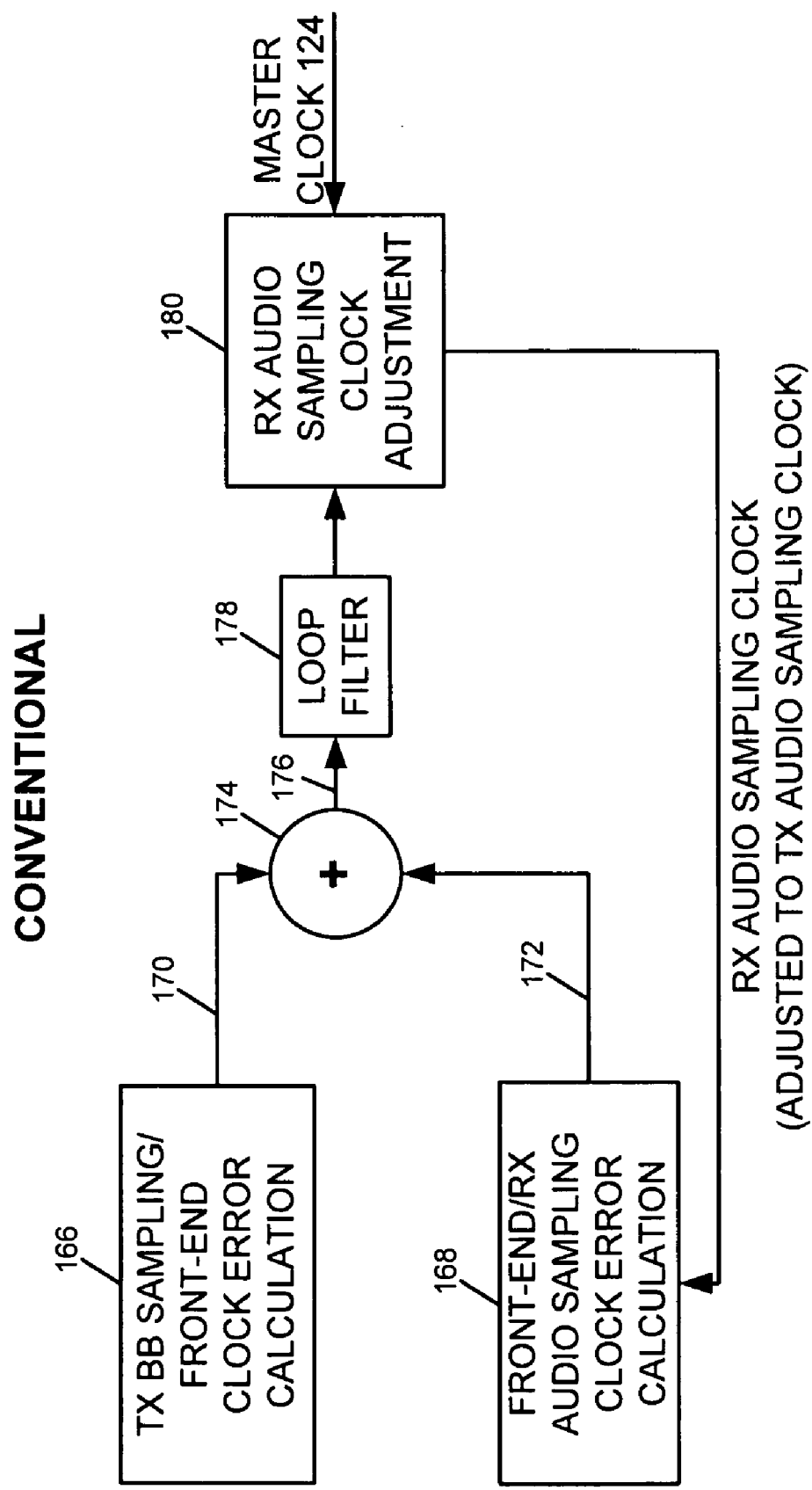
FIG. 5 illustrates an exemplary conventional technique of adjusting a receiver audio sampling clock.

Embodiments described herein permit adjusting a digital radio receiver's audio sampling rate without the synchronization of clocks between the digital radio transmitter and receiver. Whereas aspects of the disclosure are presented in the context of an exemplary IBOC system, it should be understood that the present disclosure is not limited to IBOC systems and that the teachings herein are applicable to other forms of digital radio broadcasting as well.

Throughout the specification, the terms "sampling", "sampling clock," "sampling period," and "sampling rate" will be used. Sampling refers to a process of converting an input signal into a corresponding sequence of samples that are spaced apart by predetermined amounts, e.g., uniformly in time. A sampling clock refers to a device or function, such as a local oscillator or software routine, that can provide a common reference train of electronic pulses for a digital sampling component. A sampling period refers to the period of time (typically of a fixed duration, for example) between samples of an input signal. The sampling period is governed by the sampling clock, and in instances where the sampling period is of fixed duration the sampling period will be an integer multiple of the sampling clock. The sampling rate is the reciprocal of the sampling period and refers to the number of samples taken in a period of time (e.g., a 22.7 μsec sampling period represents approximately 44,100 samples per second or 44.1 kHz).

Referring to the drawings, FIG. 1, is a block diagram of an exemplary digital radio broadcast transmitter 10 that broadcasts digital audio broadcasting signals. The exemplary digital radio broadcast transmitter may be a DAB transmitter such as an AM or FM IBOC transmitter, for example. An input signal source 12 provides the signal to be transmitted. The source signal may take many forms, for example, an analog program signal that may represent voice or music and/or a digital information signal that may represent message data such as traffic information. A baseband processor 14 processes the source signal in accordance with various known signal processing techniques, such as source coding, interleaving and forward error correction, to produce in-phase and quadrature components of a complex baseband signal on lines 16 and 18, and to produce a transmitter baseband sampling clock signal 20. Digital-to-analog converter (DAC) 22 converts the baseband signals to an analog signal using the transmitter baseband sampling clock 20, and outputs the analog signal on line 24. The analog signal is shifted up in frequency and filtered the up-converter block 26. This produces an analog signal at an intermediate frequency $f_{if}$ on line 28. An intermediate frequency filter 30 rejects alias frequencies to produce the intermediate frequency signal $f_{if}$ on line 32. A local oscillator 34 produces a signal $f_{lo}$ on line 36, which is mixed with the intermediate frequency signal on line 32 by mixer 38 to produce sum and difference signals on line 40. The unwanted intermodulation components and noise are rejected by image reject filter 42 to produce the modulated carrier signal $f_c$ on line 44. A high power amplifier (HPA) 46 then sends this signal to an antenna 48.

In one example, a basic unit of transmission of the DAB signal is the modem frame, which is typically on the order of a second in duration. Exemplary AM and FM IBOC DAB transmission systems arrange the digital audio and data in units of modem frames. In some embodiments, the systems are both simplified and enhanced by assigning a fixed number of audio frames to each modem frame. The audio frame period is the length of time required to render, e.g., play back audio for a user, the samples in an audio frame. For example, if an audio frame contains 1024 samples, and the sampling period is 22.7 μsec, then the audio frame period would be approximately 23.2 milliseconds. A scheduler determines the total number of bits allocated to the audio frames within each modem frame. The modem frame duration is advantageous because it may enable sufficiently long interleaving times to mitigate the effects of fading and short outages or noise bursts such as may be expected in a digital audio broadcasting system. Therefore the main digital audio signal can be processed in units of modem frames, and audio processing, error mitigation, and encoding strategies may be able to exploit this relatively large modem frame time without additional penalty.

In typical implementations, an audio encoder may be used to compress the audio samples into audio frames in a manner that is more efficient and robust for transmission and reception of the IBOC signal over the radio channel. The audio encoder encodes the audio frames using the bit allocation for each modem frame. The remaining bits in the modem frame are typically consumed by the multiplexed data and overhead. Any suitable audio encoder can initially produce the compressed audio frames such as an HDC encoder as developed by Coding Technologies of Dolby Laboratories, Inc., 999 Brannan Street, San Francisco, Calif. 94103-4938 USA; an Advanced Audio Coding (AAC) encoder; an MPEG-1 Audio Layer 3 (MP3) encoder; or a Windows Media Audio (WMA) encoder. Typical lossy audio encoding schemes, such as AAC, MP3, and WMA, utilize the modified discrete cosine transform (MDCT) for compressing audio data. MDCT based schemes typically compress audio samples in blocks of a fixed size. For example, in AAC encoding, the encoder may use a single MDCT block of length 1024 samples or 8 blocks of 128 samples. Accordingly, in implementations using an AAC coder, for example, each audio frame could be comprised of a single block of 1024 audio samples, and each modem frame could include 64 audio frames. In other typical implementations, each audio frame could be comprised of a single block of 2048 audio samples, and each modem frame could include 32 audio frames. Any other suitable combination of sample block sizes and audio frames per modem frame could be utilized.

An exemplary functional block diagram of a process for assembling a modem frame is illustrated in FIG. 2. The functions illustrated in FIG. 2 can be performed in the baseband processor 14 of FIG. 1, for example. An audio signal input 60, which may be digital or analog, is supplied on line 62. For analog audio signals, a digital audio interface 64 converts the analog audio into digital audio using a transmitter audio sampling clock 66 at the transmitter audio sampling rate. In typical implementations, the transmitter baseband sampling clock 26 can be synchronized with the transmitter audio sampling clock 66. For digital audio signals, the digital audio interface may up-sample or down-sample the input to match the transmitter audio sampling rate.

An audio encoder 68 (e.g., AAC, MP3, HDC, or WMA) scans the audio content of the audio information in the digital audio interface 64, which holds the audio information to be transmitted in the next modem frame. The scanning is done to estimate the complexity or "entropy" of the audio information for that modem frame. This entropy estimate can be used to project a desired number of bits required to deliver the desired audio quality. Using this entropy estimate a scheduling algorithm can allocate the desired number of bits in the modem frame. An exemplary scheduling algorithm is described in U.S. Pat. No. 6,721,337.

After a number of bits has been allocated for the next modem frame, the audio encoder 68 encodes blocks of samples in all the audio frames (e.g., 64 audio frames) for the next modem frame and passes its result to the multiplexer (MUX) 70. The actual number of bits consumed by the audio frame are presented to the scheduling algorithm in the MUX so that it can make best use of the unused bit allocation, if any. The MUX receives audio frames from the audio encoder 68 and data from the data source 72 and outputs multiplexed audio frames and data to the modulator 74. The modulator 74 modulates the audio frames and any data packets into baseband samples for a modem frame and outputs the baseband samples on line 76 and the transmitter baseband sampling clock 20 on line 78.

The receiver performs the inverse of some of the functions described for the transmitter. FIG. 3 is a block diagram of an exemplary digital radio broadcast receiver 90. The exemplary digital radio broadcast receiver 90 may be a DAB receiver such as an AM or FM IBOC receiver, for example. The DAB signal is received on antenna 92. A bandpass preselect filter 94 passes the frequency band of interest, including the desired signal at frequency $f_c$, but rejects the image signal at $f_c-2f_{if}$ (for a low side lobe injection local oscillator). Low noise amplifier (LNA) 96 amplifies the signal. The amplified signal is mixed in mixer 98 with a local oscillator signal $f_{lo}$ supplied on line 100 by a tunable local oscillator 102. This creates sum $(f_c+f_{lo})$ and difference $(f_c-f_{lo})$ signals on line 104. Intermediate frequency filter 106 passes the intermediate frequency signal $f_{if}$ and attenuates frequencies outside of the bandwidth of the modulated signal of interest. An analog-to-digital converter (ADC) 108 operates using the front-end clock 110 to produce digital samples on line 112. Digital down converter 114 frequency shifts, filters and decimates the signal to produce lower sample rate in-phase and quadrature signals on lines 116 and 118. The digital down converter 114 also outputs a receiver baseband sampling clock signal 120. A baseband processor 122, operating using the master clock 124 that may or may not be generated from the same oscillator as the front-end clock 110, then provides additional signal processing. The baseband processor produces output audio samples on line 126 for output audio sink 128. The output audio sink may be any suitable device for rendering audio such as an audio-video receiver or car stereo system. In conventional systems the baseband processor can also provide an adjusted audio sampling clock signal 130 that is synchronized with the transmitter audio sampling clock signal 66 as described below.

An exemplary functional block diagram of a process for demodulating audio signals and data signals from a modem frame is illustrated in FIG. 4. The functions illustrated in FIG. 4 can be performed in the baseband processor 122 of FIG. 3, for example, which can comprise a processing system that may include one or more processing units configured (e.g., programmed with software and/or firmware) to perform the functionality described herein, wherein the processing system of the baseband processor can be suitably coupled to any suitable memory (e.g., RAM, Flash ROM, ROM). A demodulator 140 receives the baseband signal to be processed on line 142 and performs all the necessary operations of deinterleaving, code combining, FEC decoding, and error flagging of the audio and data information. The baseband signal is then passed to a demultiplexer (DEMUX) 144, which separates the audio signals and data signals. The data, if any, is outputted on a separate path from the audio to data output 146.

The audio information from each modem frame is processed by an audio decoder 148. The audio decoder 148 decodes the audio signals and outputs each audio frame of digital audio samples to a digital audio interface 150. The audio decoder 148 may include a function that is called every time the current audio frame of digital audio samples have been processed by the digital audio interface 150, which is a digital interface that can communicate with an output such as a car stereo system for rendering audio for a user and/or a digital processor that can store digital audio data. When the audio decoder 148 is called it will typically output a single audio frame of audio samples, e.g., 1024 audio samples for an AAC decoder or 2048 audio samples for other typical decoders. In some embodiments a direct memory access (DMA) channel may be used to transfer audio frames of audio samples from the audio decoder 148 to the digital audio interface 150. Therefore, the DMA buffer can normally be programmed for blocks of fixed size such as 1024 or 2048 samples. In alternative embodiments, the output audio samples from the audio decoder can be copied under the control of a processing unit (e.g., in the baseband processor) to the digital audio interface 150. The digital audio interface 150 then outputs the audio samples to the output audio sink 128.

Referring back to FIG. 2, the audio encoder 68 of the transmitter can be driven by the transmitter audio sampling clock 66. As discussed above, the transmitter audio sampling clock 66 can be synchronized with the transmitter baseband sampling clock 26. However, the receiver baseband sampling clock differs from the transmitter baseband sampling clock because it is derived from the independent front-end clock 110. Thus the receiver baseband sampling rate can be adjusted to compensate for the difference between the transmitter baseband sampling clock and the receiver baseband sampling clock. Moreover, referring to FIGS. 3 and 4, the receiver baseband sampling clock 120, which is derived from the front-end clock 110, may not be synchronized with the receiver audio sampling clock 152, which may be derived from an independent master clock 124. The front-end clock 110 may be generated from the same oscillator as the master clock 154 or it may be generated from a different oscillator. Therefore the transmitter audio sampling clock and the receiver audio sampling clock are not synchronized.

Differences between the audio sampling clock rates mean that the transmitter audio sampling rate, which is driven by the transmitter audio sampling clock, may be different than the receiver audio sampling rate, which is driven by the receiver audio sampling clock. This difference in sampling rates may eventually result in overflowing or underflowing of the receiver's audio decoder buffers, which can cause distortions in the output audio signal. For example, assume that the transmitter sampling period is 22.7 μsec and the receiver sampling period is 22.8 μsec. In this case, the audio encoder will generate 227 samples in 5.1529 ms while the audio decoder will attempt to decode 227 samples in 5.1756 ms. Thus the audio decoder will fall behind the encoder, thereby resulting in buffer overflow. Over time, this difference could result in audio distortions. As a result, in order to properly decode the audio in the receiver (e.g., without generating audio distortions), the receiver audio sampling rate should be synchronized with the transmitter audio sampling rate. In conventional systems this is done by adjusting the receiver audio sampling clock 152 to match the transmitter audio sampling clock 66.

An exemplary functional block diagram of a conventional method of adjusting the receiver audio sampling clock is illustrated in FIG. 5. The conventional method is similar to a phase-locked loop (PLL) that calculates the phase error between the transmitter audio sampling clock and the receiver audio sampling clock and adjusts the receiver audio sampling clock accordingly. The functions illustrated in FIG. 5 may be performed in a baseband processor 122 of FIG. 3. A first error signal 170 between a transmitter baseband sampling clock and a receiver front-end clock is calculated by transmitter baseband sampling/front-end clock error calculation block 166. Block 166 may execute, for example, in a demodulator of the baseband processor. An exemplary technique of generating this error signal is described in commonly owned U.S. Patent Application Publication No. 2007/0110185, which describes an exemplary symbol tracking algorithm for AM IBOC digital radio receivers. For FM transmission, the symbol tracking can be accomplished through observation of the phase drift from symbol to symbol over time or frequency (across subcarriers) using any suitable implementation approach, such as noted, for example, in U.S. Pat. No. 6,671,340. Additionally, a second error signal 172 between a receiver front-end clock and a receiver audio sampling clock 152 is calculated by front-end/receiver audio sampling clock error calculation block 168.

The first error signal 170 and second error signal 172 are summed by a phase error accumulator 174, which typically comprises an adder and a register with feedback from the register to the adder, thereby generating an output error signal 176 having the total error between the transmitter baseband sampling clock and the receiver audio sampling clock. Since the transmitter baseband sampling clock is synchronized with the transmitter audio sampling clock as previously described, this output error signal 176 represents the difference between the transmitter audio sampling clock and receiver audio sampling clock. This output error signal 176 is input into a low-pass loop filter 178, which minimizes abrupt changes in the receiver audio sampling clock. The filtered error signal is then output to a receiver audio sampling clock adjustment block 180, which operates similarly to a voltage controlled oscillator (VCO) in a typical PLL. To illustrate, assume that initially the receiver audio sampling clock is at nearly the same frequency as the transmitter audio sampling clock. Then, if the receiver audio sampling clock falls behind the transmitter audio sampling clock, the receiver audio sampling clock adjustment block 180 increases the clock speed of the receiver audio sampling clock. Likewise, if the receiver audio sampling clock creeps ahead of the transmitter audio sampling clock, the receiver audio sampling clock adjustment block 180 reduces the clock speed of the receiver audio sampling clock.

However, audio sampling clock adjustment of the type illustrated in the conventional arrangement of FIG. 5 is possible only in receiver configurations wherein the receiver baseband processor is the master of the receiver audio sampling clock. If the receiver audio sampling clock is controlled by another component in the receiver, then the receiver baseband processor can not adjust it. This may be the case, for example, in cellular phones and in automobile digital radio receivers that utilize a Media Oriented Systems Transport 50 (MOST50) network architecture. Therefore to minimize artifacts in the decoded digital audio signals, an alternative audio sampling rate adjustment scheme is disclosed herein below.

Figure 6:
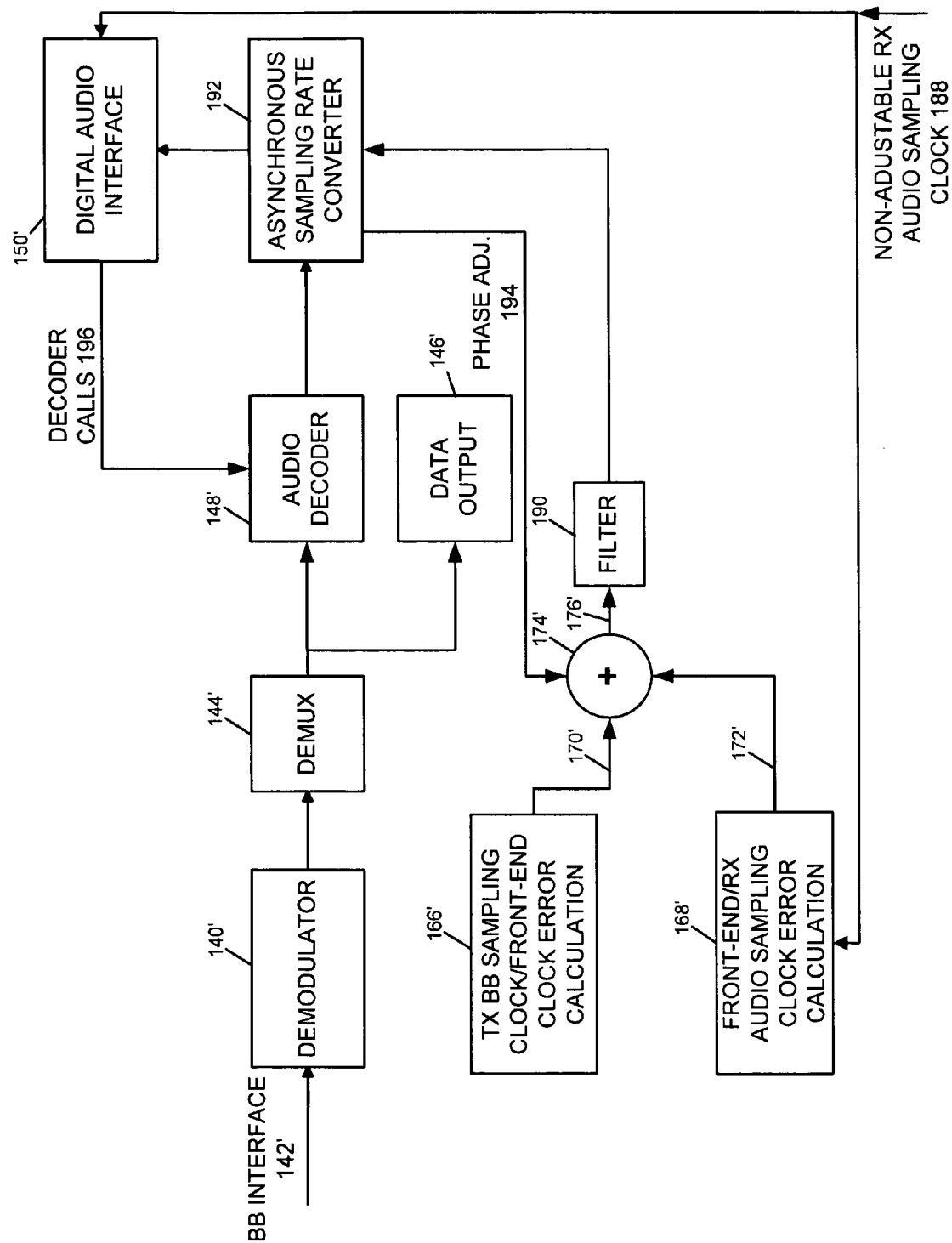
FIG. 6 illustrates a block diagram of an exemplary baseband processor in accordance with certain embodiments.

An exemplary functional block diagram for audio sampling rate adjustment in accordance with the present disclosure is illustrated in FIG. 6. The functions illustrated in FIG. 6 may be performed in the baseband processor 122 of FIG. 3, for example, which can comprise a processing system that may include one or more processing units configured (e.g., programmed with software and/or firmware) to perform the functionality described herein, wherein the processing system of the baseband processor can be suitably coupled to any suitable memory (e.g., RAM, Flash ROM, ROM). The initial decoding of the audio samples and the generation of an error signal are similar to the process described above and therefore like elements are denoted with like reference numerals. For example, the functions of the demodulator 140', baseband interface 142', demultiplexer 144', data output 146', and audio decoder 148' are like those described previously in exemplary embodiments. However, in this exemplary embodiment a non-adjustable receiver audio sampling clock 188 is utilized by the digital audio interface 150' for audio sample reconstruction. As shown in FIG. 6, a first error signal 170' between the transmitter baseband sampling clock and the receiver front-end clock is calculated by transmitter baseband sampling clock/front-end clock error calculation block 166' as described above. These calculations can be performed, for example, in the demodulator 140'. Additionally, a second error signal 172' between the receiver front-end clock 110 and the receiver audio sampling clock 152 is calculated by front-end/receiver audio sampling clock error calculation block 168'.

The first error signal 170' and second error signal 172' are summed in a phase error accumulator 174', thereby generating an output error signal 176' having the total error between the transmitter baseband sampling clock and the non-adjustable receiver audio sampling clock 188. Since the transmitter baseband sampling clock 20 is synchronized with the transmitter audio sampling clock 66 as previously described, this output error signal 176' represents the difference between the transmitter audio sampling clock and the non-adjustable receiver audio sampling clock 188. This output error signal 176' is input into a low pass filter 190, which minimizes abrupt changes between the transmitter and the receiver audio sampling rates. The filtered error signal is then output to an asynchronous sampling rate converter (ASRC) 192 that may be configured at the output of the receiver audio decoder 148'.

The ASRC 192 typically comprises an up-sampler, digital filter (e.g., a FIR filter), an interpolator (e.g., a linear interpolator or a polynomial interpolator) and then a down-sampler, The ASRC 192 may be implemented in hardware, software, firmware, or any suitable combination thereof such as, for example, a software function implemented via the processing system of the baseband processor 122. Any suitable interpolation and filtering technique ensuring acceptable audio quality may be used as would be known to one of skill in the art (e.g., linear interpolation, polynomial interpolation, etc.). The ASRC 192 implements a sampling rate conversion ratio between the input sampling rate and the output sampling rate that is adjustable according to the phase difference between the non-adjustable receiver audio sampling clock and the transmitter audio sampling clock. As described above, the number of samples output by the audio decoder in a given audio frame period will typically be fixed (e.g., 1024 or 2048 samples). However, the number of samples that the ASRC will produce in a given audio frame period will depend on the phase difference and will typically be slightly less than, equal to, or slightly greater than the number of samples output by the audio decoder. For example, for AAC encoding and decoding the audio frame size may be 1024 samples and so the ASRC may output an audio frame of 1023, 1024, or 1025 samples. If the encoder and decoder audio frame size were 2048 samples, then the ASRC output might vary between 2047, 2048, and 2049 samples, for example. In embodiments utilizing DMA, the DMA block size may need to be dynamically re-programmed so that it matches the number of samples produced by the ASRC.

The ASRC 192 dynamically changes the number of output samples in a given audio frame in order to correct for a difference between the transmitter audio sampling rate and the receiver audio sampling rate. The difference between the input and output sample rates of the ASRC 192 is then fed back into the phase error accumulator 174' via phase adjustment line 194 to adjust the measured phase error between the non-adjustable receiver sampling clock 188 and the transmitter audio sampling clock 66. For example, if the non-adjustable receiver audio sampling clock 188 is faster than the transmitter audio sampling clock, the receiver's audio decoder may be called faster than the transmitter's audio encoder. Initially, the output number of samples from the ASRC will match the input number of samples for each audio frame. For example, if in a given audio frame period determined by the non-adjustable audio sampling clock 188 an audio frame of 1024 audio samples is input, then a block of 1024 audio samples will be output in the same audio frame period (after some processing delay). Typically, the error signal 176' that represents the phase error between the transmitter audio sampling clock and the receiver non-adjustable audio sampling clock 188 is constant or changing very slowly. If the error signal's value is non-zero, then the audio frame sampling period of audio samples at the output of the ASRC will be changed gradually. The audio frame sampling period can be increased or decreased relative to the audio frame sampling period for a frame of samples output from the audio decoder (e.g., a fixed audio frame of 1024 or 2048 samples) depending on the sign of the error signal at the output of the filter 190. After a number of audio frames has elapsed the differences in audio sampling periods will accumulate to such an extent that the ASRC will output 1025 or 1023 audio samples in a given audio frame period.

For example, when the non-adjustable receiver audio sampling clock is faster than the transmitter audio sampling clock, the digital audio interface 150' (e.g., a software function implemented via the processing system of the baseband processor 122) may call the receiver's audio decoder at a faster rate than the transmitter's audio encoder is called. Initially, the output number of samples from the ASRC will match the input number of samples for each audio frame. For example, if an audio frame of 1024 audio samples is input, then a block of 1024 audio samples will be output. At some point the difference between the audio sampling rates will accumulate until the audio decoder is a full sample ahead of the audio encoder as described above. At this point the ASRC 192 adjusts the audio sampling period at its output by generating 1025 samples in the output audio frame. Then the ASRC outputs the 1025 audio samples to the digital audio interface 150'. As a result of the additional audio sample, the next call to the audio decoder 148' on line 196 will occur one audio sample period (e.g., 22.7 μsec) later than it did when the digital audio interface received 1024 audio samples. In embodiments that utilize DMA for outputting the samples, the DMA will be programmed for a 1025 sample block size. Advantageously, this effectively resynchronizes the transmitter audio sampling rate and the receiver audio sampling rate.

In the opposite case, i.e., when the non-adjustable receiver audio sampling clock is slower than the transmitter audio sampling clock, the digital audio interface 150' may call the receiver's audio decoder at a slower rate than the transmitter's audio encoder is called. Initially, the output number of samples from the ASRC will match the input number of samples for each audio frame. For example, if an audio frame of 1024 audio samples is input, then a block of 1024 audio samples will be output. At some point the difference between the audio sampling rates will accumulate until the audio decoder is a full sample behind the audio encoder as described above. At this point the ASRC 192 adjusts the audio sampling period at its output by generating 1023 samples in the output audio frame. Then the ASRC outputs the 1023 audio samples to the digital audio interface 150'. As a result of the removed audio sample, the next call to the audio decoder 148' on line 196 will occur one audio sample period (e.g., 22.7 μsec) earlier than it did when the digital audio interface received 1024 audio samples. In embodiments that utilize DMA for outputting the samples, the DMA will be programmed for a 1023 sample block size. Advantageously, this effectively resynchronizes the transmitter audio sampling rate and the receiver audio sampling rate.

While the exemplary embodiments described above refer to the transmission of digital audio signals, embodiments of the present disclosure may also be applicable to the transmission of digital video signals. For example, the transmitter could include a digital video interface and a video encoder. The receiver could include a video decoder and a digital video interface. Any suitable video compression scheme could be utilized such as H.261, H.262, H.263, H.264 or Windows Media Video (WMV). The operation of the ASRC would be similar in a digital video transmission system to the ASRC described above for a DAB system.

Figure 7:
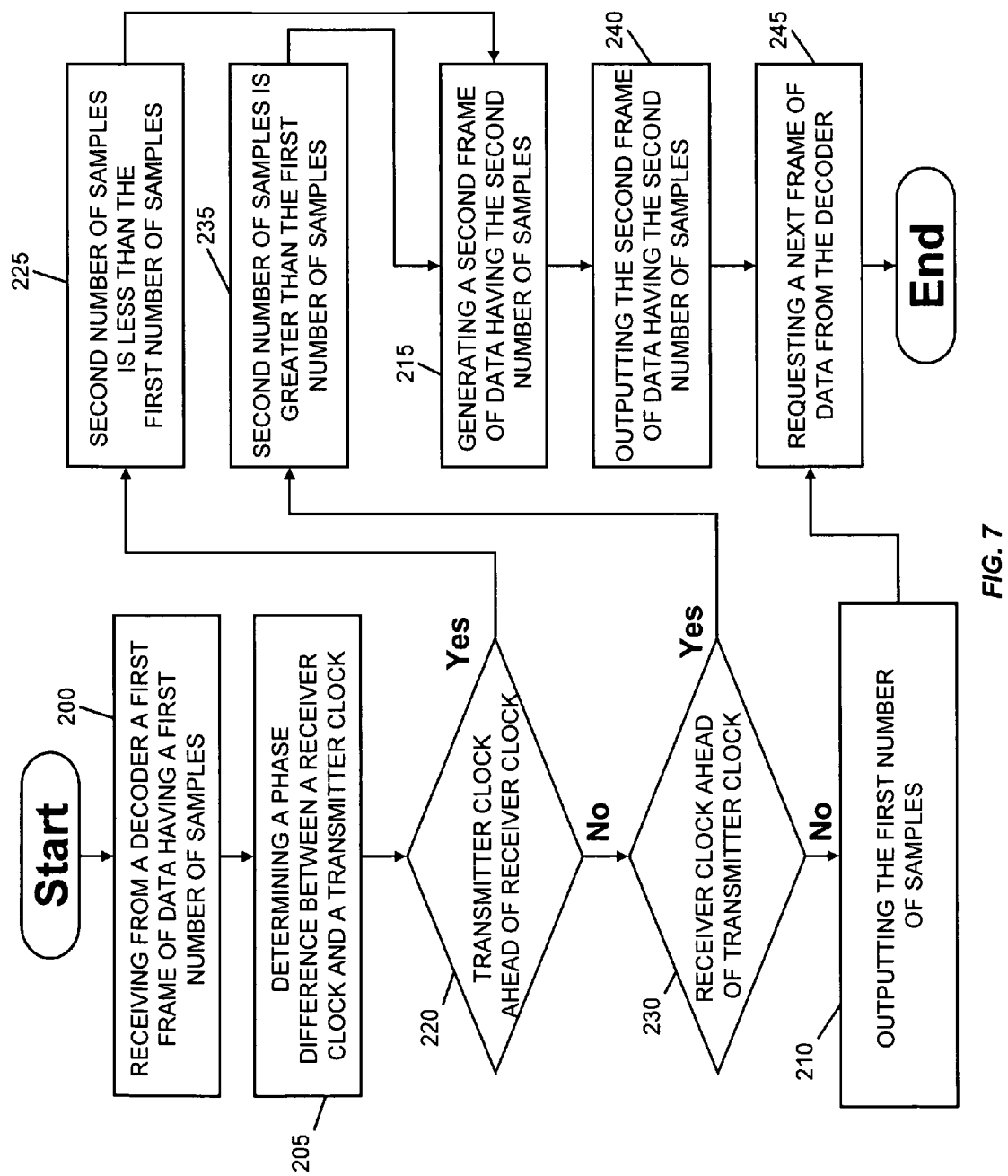
FIG. 7 shows a flow chart illustrating an exemplary process for adjusting an IBOC DAB receiver audio sampling rate in accordance with certain embodiments.

FIG. 7 illustrates an exemplary process for adjusting the sampling rate of a digital radio receiver. In this process, the ASRC receives from a decoder a first frame of data having a first number of samples in step 200. This first number of samples may be a constant number of audio samples such as 1024 or 2048 that is output from an audio decoder. Any suitable audio decoder may be used such as an AAC, WMA, HDC, or MP3 decoder. In alternative embodiments, the first number of samples may be a fixed number of video samples that is output from a video decoder. Any suitable video decoder may be used such as H.261, H.262, H.263, H.264 or Windows Media Video (WMV) decoders. Next, a baseband processor (e.g., baseband processor 122) determines at the digital radio receiver a phase difference between a receiver clock and a transmitter clock in step 205. In some embodiments, the receiver clock is a receiver audio sampling clock and the transmitter clock is a transmitter audio sampling clock. In alternative embodiments, the receiver clock may be a receiver video sampling clock and the transmitter clock may be a transmitter video sampling clock.

Initially, the ASRC will receive the first frame of data having the first number of samples in the audio frame period and output the same number of samples in step 210. However, when the transmitter clock and the receiver clock are not synchronized, a phase difference between the clocks will accumulate as frames of samples are continuously decoded by the receiver. Once the difference exceeds a predetermined threshold, for example, the receiver is one full sample ahead of or behind the transmitter, then the ASRC will generate a second frame of data that has a second number of samples in the output frame in step 215. Of course, other numbers of samples could be used for the predetermined threshold. If the transmitter clock is ahead of the receiver clock (e.g., a negative error signal) in step 220, then in step 225 the ASRC generates at the digital radio receiver a second number of samples that is less than the first number of samples. This generation typically involves up-sampling, filtering, interpolating, and down-sampling data input samples to generate fewer output samples than there were input samples. Any suitable up-sampler, filter, interpolator, and down-sampler can be used, such as conventional techniques known to those of skill in the art. In typical embodiments, the second number of samples may be one less than the first number of samples. For example, if the first number of samples is 1024, then the second number of samples could be 1023.

If the receiver clock is ahead of the transmitter clock (e.g., a positive error signal) in step 230, then in step 235 the ASRC generates at the digital radio receiver a second number of samples that is greater than the first number of samples. This generation typically involves up-sampling, filtering, interpolating, and down-sampling input samples to generate more output samples than there were input samples. In typical embodiments, the second number of samples may be one more than the first number of samples. For example, if the first number of samples is 1024, then the second number of samples could be 1025.

In step 240 the ASRC outputs the second frame of data having the second number of samples to a digital audio interface. In some embodiments, the output may utilize DMA to store the data in a memory. Finally, in step 245 the digital audio interface requests the next frame of data from the decoder at a time that is earlier than the processing time for the first number of samples if the transmitter clock is ahead of the receiver clock and at a time that is later than the processing time for the first number of samples if the receiver clock is ahead of the transmitter clock such that the next frame of data from the decoder and the next transmitter frame are synchronized, and wherein whether the second number of samples is greater than or less than the first number of samples is determined by whether the sampling rate is increased or decreased. The processing time for the first number of samples is typically the amount of time required by the digital audio processor to render, for example, 1024 or 2048 digital audio samples at the appropriate digital audio sample period.

Figure 8:
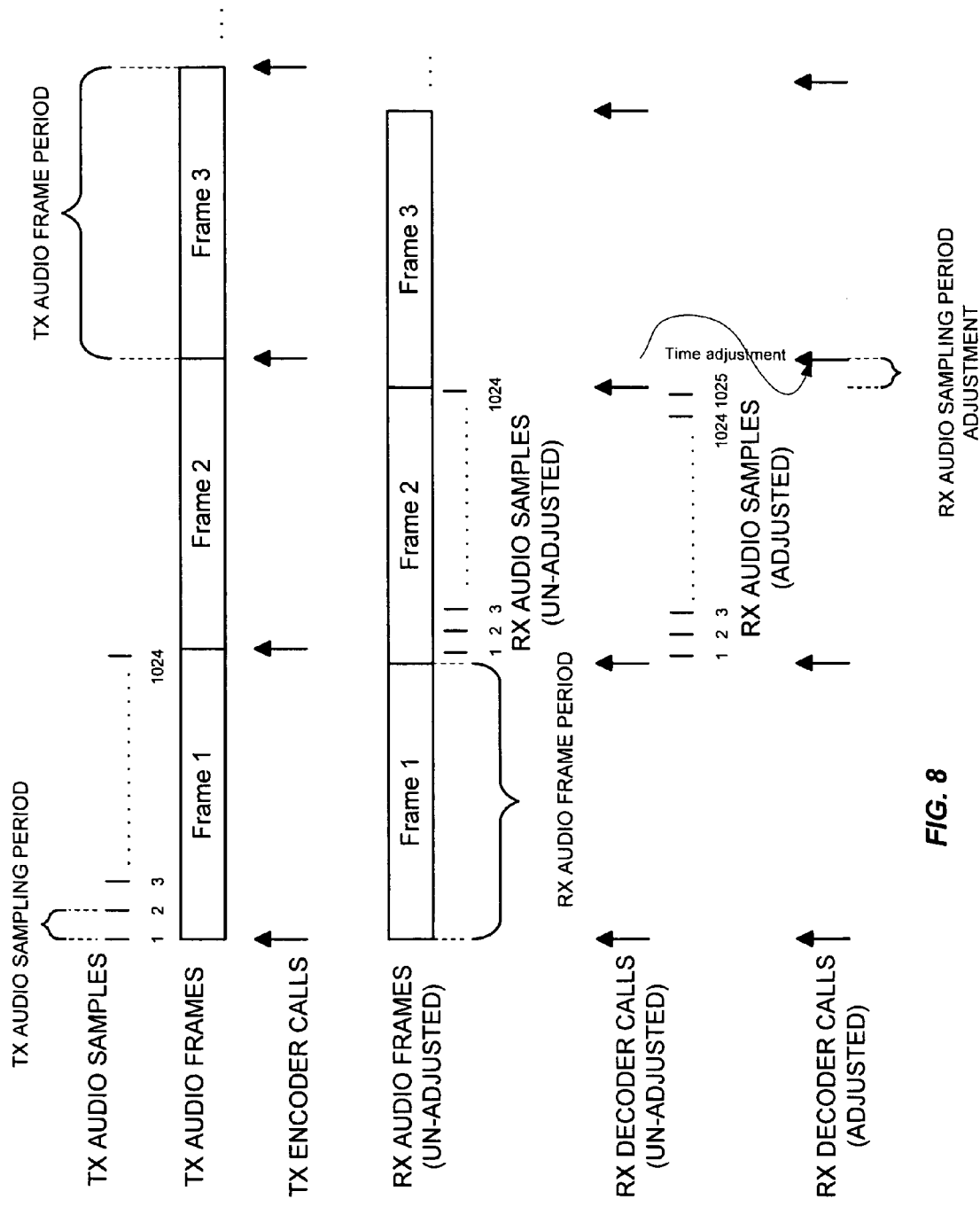
FIG. 8 illustrates exemplary transmitter and receiver audio frames in accordance with certain embodiments.

FIG. 8 illustrates exemplary digital radio transmitter and receiver audio frames in accordance with some embodiments. As illustrated, the exemplary transmitter audio frames (frame 1, frame 2, and frame 3) each contain 1024 samples. Each transmitter audio frame has a predetermined transmitter audio frame period that describes the amount of time required to render all the samples in each audio frame. The encoder is called once each transmitter audio frame period. The digital radio receiver receives the audio frames (frame 1, frame 2, and frame 3) and decodes them, calling the decoder once for each receiver audio frame. However, in the example shown in FIG. 8, the receiver audio sampling clock is slightly faster than the transmitter audio sampling clock. Accordingly, the receiver audio frames, if left un-adjusted, would be slightly shorter than the transmitter audio frames. This would result in the call time for the decoder creeping ahead of the call time for the encoder. However, by adding an extra sample to audio frame 2 (thereby creating 1025 samples in frame 2), the digital audio receiver will take one sample period longer to process frame 2. This results in the decoder being called one sample period later than it would have been with only 1024 samples. As a result, the time at which the decoder is called to begin decoding frame 3 is adjusted such that it is resynchronized with the encoder call time.

The previously described embodiments of the present disclosure have advantages. One advantage is that in certain embodiments, the receiver audio sampling rate may be adjusted without having to adjust the receiver audio sampling clock. This is advantageous in architectures wherein the receiver baseband processor is not the master of the audio sampling clock.

The exemplary approaches described may be carried out using any suitable combinations of software, firmware and hardware and are not limited to any particular combinations of such. Computer program instructions for implementing the exemplary approaches described herein may be embodied on a computer-readable medium, such as a magnetic disk or other magnetic memory, an optical disk (e.g., DVD) or other optical memory, RAM, ROM, or any other suitable memory such as Flash memory, memory cards, etc.

Additionally, the disclosure has been described with reference to particular embodiments. However, it will be readily apparent to those skilled in the art that it is possible to embody the disclosure in specific forms other than those of the embodiments described above. The embodiments are merely illustrative and should not be considered restrictive. The scope of the disclosure is given by the appended claims, rather than the preceding description, and all variations and equivalents which fall within the range of the claims are intended to be embraced therein.

What is claimed is:

1. A method of adjusting a sampling rate of a digital radio receiver comprising the steps of:

receiving from a decoder a first frame of data having a first number of samples;

determining at the digital radio receiver a phase difference between a receiver clock and a transmitter clock;

generating at the digital radio receiver a second frame of data having a second number of samples, wherein the second number of samples depends on the phase difference between the receiver clock and the transmitter clock such that the second number of samples is less than the first number of samples if the transmitter clock is ahead of the receiver clock, and the second number of samples is greater than the first number of samples if the receiver clock is ahead of the transmitter clock;

outputting the second frame of data having the second number of samples; and requesting a next frame of data from the decoder at a time that is earlier than a processing time for the first number of samples if the transmitter clock is ahead of the receiver clock and at a time that is later than the processing time for the first number of samples if the receiver clock is ahead of the transmitter clock, such that the next frame of data from the decoder and a next transmitter frame are synchronized, wherein whether the second number of samples is greater than or less than the first number of samples is determined by whether the sampling rate is increased or decreased.

2. The method of claim 1 wherein the first frame of data is interpolated to generate the second frame of data.

3. The method of claim 1 wherein the first number of samples is constant.

4. The method of claim 3 wherein the first number of samples is 2048.

5. The method of claim 1 wherein the second number of samples is one less than the first number of samples if the transmitter clock is ahead of the receiver clock.

6. The method of claim 1 wherein the second number of samples is one more than the first number of samples if the receiver clock is ahead of the transmitter clock.

7. The method of claim 1 wherein outputting the second frame of data comprises storing the data in a memory using direct memory access.

8. The method of claim 1 wherein the first frame of data is digital audio data.

9. The method of claim 8 wherein the decoder is an advanced audio coding decoder.

10. The method of claim 1 wherein the first frame of data is digital video data.

11. The method of claim 10 wherein the decoder is a H.264 decoder.

12. A digital radio receiver system configured to adjust a sampling rate comprising:
   a processing system; and
   a memory coupled to the processing system, wherein the processing system is configured to execute steps comprising:
      receiving from a decoder a first frame of data having a first number of samples;
      determining at the digital radio receiver a phase difference between a receiver clock and a transmitter clock;
      generating at the digital radio receiver a second frame of data having a second number of samples, wherein the second number of samples depends on the phase difference between the receiver clock and the transmitter clock such that
         the second number of samples is less than the first number of samples if the transmitter clock is ahead of the receiver clock, and
         the second number of samples is greater than the first number of samples if the receiver clock is ahead of the transmitter clock;
      outputting the second frame of data having the second number of samples; and
      requesting a next frame of data from the decoder at a time that is earlier than a processing time for the first number of samples if the transmitter clock is ahead of the receiver clock and at a time that is later than the processing time for the first number of samples if the receiver clock is ahead of the transmitter clock, such that the next frame of data from the decoder and a next transmitter frame are synchronized, wherein whether the second number of samples is greater than or less than the first number of samples is determined by whether the sampling rate is increased or decreased.

13. The digital radio receiver system of claim 12 wherein the first frame of data is interpolated to generate the second frame of data.

14. The digital radio receiver system of claim 12 wherein the first number of samples is constant.

15. The digital radio receiver system of claim 14 wherein the first number of samples is 2048.

16. The digital radio receiver system of claim 12 wherein the second number of samples is one less than the first number of samples if the transmitter clock is ahead of the receiver clock.

17. The digital radio receiver system of claim 12 wherein the second number of samples is one more than the first number of samples if the receiver clock is ahead of the transmitter clock.

18. The digital radio receiver system of claim 12 wherein outputting the second frame of data comprises storing the data in a memory using direct memory access.

19. The digital radio receiver system of claim 12 wherein the first frame of data is digital audio data.

20. The digital radio receiver system of claim 19 wherein the decoder is an advanced audio coding decoder.

21. The digital radio receiver system of claim 12 wherein the first frame of data is digital video data.

22. The digital radio receiver system of claim 21 wherein the decoder is a H.264 decoder.

23. A tangible computer readable medium comprising computer program instructions adapted to cause a processing system to execute steps comprising:
   receiving from a decoder a first frame of data having a first number of samples;
   determining at the digital radio receiver a phase difference between a receiver clock and a transmitter clock;
   generating at the digital radio receiver a second frame of data having a second number of samples, wherein the second number of samples depends on the phase difference between the receiver clock and the transmitter clock such that
      the second number of samples is less than the first number of samples if the transmitter clock is ahead of the receiver clock, and
      the second number of samples is greater than the first number of samples if the receiver clock is ahead of the transmitter clock;
   outputting the second frame of data having the second number of samples; and
   requesting a next frame of data from the decoder at a time that is earlier than a processing time for the first number of samples if the transmitter clock is ahead of the receiver clock and at a time that is later than the processing time for the first number of samples if the receiver clock is ahead of the transmitter clock, such that the next frame of data from the decoder and a next transmitter frame are synchronized, wherein whether the second number of samples is greater than or less than the first number of samples is determined by whether the sampling rate is increased or decreased.

24. The tangible computer readable medium of claim 23 wherein the first frame of data is interpolated to generate the second frame of data.

25. The tangible computer readable medium of claim 23 wherein the first number of samples is constant.

26. The tangible computer readable medium of claim 25 wherein the first number of samples is 2048.

27. The tangible computer readable medium of claim 23 wherein the second number of samples is one less than the first number of samples if the transmitter clock is ahead of the receiver clock.

28. The tangible computer readable medium of claim 23 wherein the second number of samples is one more than the first number of samples if the receiver clock is ahead of the transmitter clock.

29. The tangible computer readable medium of claim 23 wherein outputting the second frame of data comprises storing the data in a memory using direct memory access.

30. The tangible computer readable medium of claim 23 wherein the first frame of data is digital audio data.

31. The tangible computer readable medium of claim 30 wherein the decoder is an advanced audio coding decoder.

32. The tangible computer readable medium of claim 23 wherein the first frame of data is digital video data.

33. The tangible computer readable medium of claim 32 wherein the decoder is a H.264 decoder.

* * * * *